UNITED STATES PATENT OFFICE.

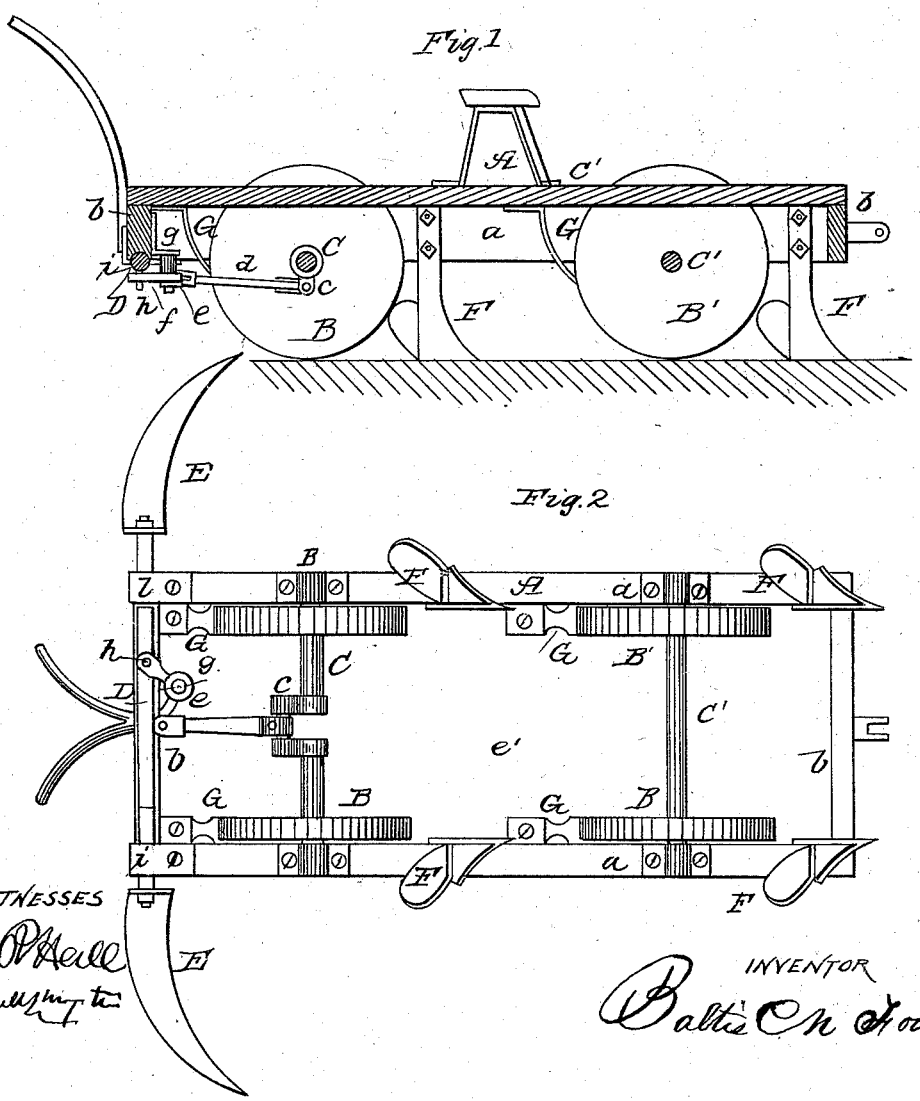

BOLTIS M. FOWLER, OF BROOKLYN, NEW YORK.

IMPROVEMENT IN CORN-HARVESTERS.

Specification forming part of Letters Patent No. 43,487, dated July 12, 1864.

*To all whom it may concern:*

Be it known that I, B. M. FOWLER, of Brooklyn, in the county of Kings and State of New York, have invented a new and Improved Machine for Cutting Standing Corn; and I do hereby declare that the following is a full, clear, and exact description of the same, reference being had to the accompanying drawings, making a part of this specification, in which—

Figure 1 represents a longitudinal vertical section of my invention. Fig. 2 is an inverted plan of the same.

Similar letters of reference indicate corresponding parts in both views.

This invention relates to certain improvements in that class of machines which serve to cut standing corn.

The invention consists in the employment or use of reciprocating scythes secured to the rear cross-bar of a truck, which rests on four wheels, from the axle of one pair of which motion is transmitted to the scythes by means of a crank, pitman, and bell-crank lever, or by any other suitable mechanism, in such a manner that in drawing said truck through a cornfield by the action of the scythes the corn is cut, and the operation of cutting corn can thus be effected with little exertion and in a very short time.

To enable others skilled in the art to make and use my invention, I will proceed to describe it.

A represents a truck, the frame of which is composed of two longitudinal timbers, $a$, and two cross-timbers, $b$, and which is or may be provided with a platform, $c'$. This truck is provided with four wheels, B B'—two in front and two aft—and these wheels run on axles C C', which have their bearings in suitable boxes secured to the longitudinal timbers of the truck-frame, as clearly shown in Fig. 2 of the drawings. The axle C of the hind wheels, B, is provided with a crank, $c$, which connects by means of a pitman, $d$, with one arm of an elbow-lever, $e f$. This elbow-lever has its fulcrum on a pivot secured in a suitable bracket, $g$, which is attached to the rear cross-bar, $b$, of the truck-frame, and the arm $f$ of said lever is provided with a slot catching over a pin, $h$, which is inserted into a bar, D, as clearly shown in Fig. 2. This bar is situated under the rear cross-bar of the truck-frame, being held in place by suitable boxes, $i$, and it is so arranged that it can move freely in either direction.

E E are the scythes, which are secured to the ends of the bar D in an upwardly-inclined position. The cutting-edge of these scythes may either be plain or serrated, and they are placed at such a distance apart as may be required by the width of the rows of corn.

The wheels of the truck A are intended to run in two furrows, and in order to prevent irregularities in their motion the truck is provided with track-clearers F, which extend down one before each wheel, and by these track-clearers lumps, stones, or other obstructions lying in the track of the wheels are pushed on one side, and the motion of the wheels is rendered regular. Suitable scrapers, G, serve to clear the circumference of said wheels from any dirt that may adhere to them. The track-clearers can be used internally or externally, as may be desired.

On drawing this machine through a cornfield the scythes receive a reciprocating motion by the action of the crank $c$, pitman $d$, and elbow-lever $e f$, and two rows of corn are cut simultaneously. It is obvious that by suitable gear-wheels or other mechanism the velocity of the reciprocating motion of the scythes can be increased at pleasure, and, if desired, a zigzag motion may be imparted to said scythes, in order to increase the facility of cutting.

What I claim as new, and desire to secure by Letters Patent, is—

The employment or use of reciprocating scythes E, in combination with the crank-axle C, wheels B B', track-clearers F, and truck A, constructed and operating in the manner and for the purpose substantially as herein shown and described.

BOLTIS M. FOWLER.

Witnesses:
JAMES P. HALL,
GILBERT W. BANKER.